C. C. FOUTS.
GRAIN BIN.
APPLICATION FILED OCT. 5, 1916.
1,274,868.
Patented Aug. 6, 1918.
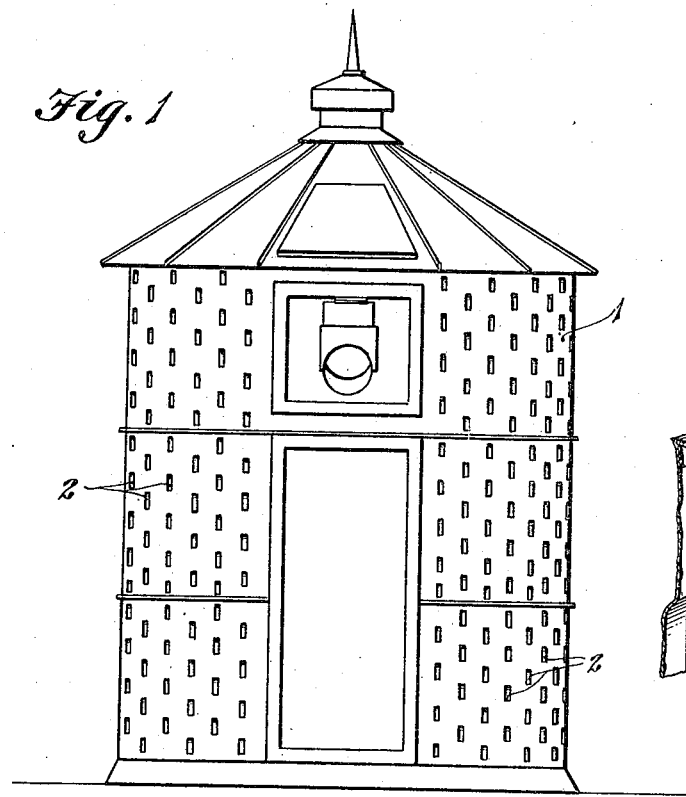
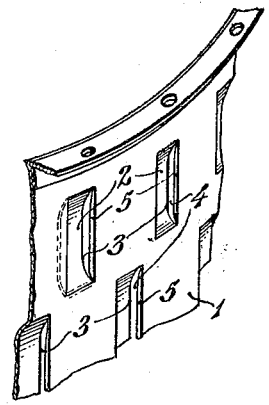
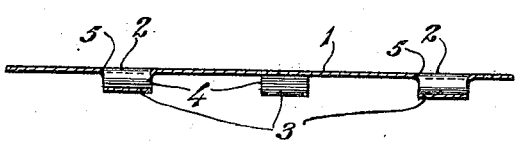
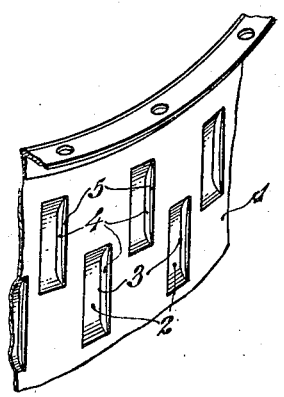
INVENTOR.
BY Calvin C. Fouts
ATTORNEY

UNITED STATES PATENT OFFICE.

CALVIN C. FOUTS, OF MIDDLETOWN, OHIO, ASSIGNOR TO THE C. C. FOUTS COMPANY, OF MIDDLETOWN, OHIO, A CORPORATION OF OHIO.

GRAIN-BIN.

1,274,868.      Specification of Letters Patent.      Patented Aug. 6, 1918.

Application filed October 5, 1916. Serial No. 123,885.

*To all whom it may concern:*

Be it known that I, CALVIN C. FOUTS, a citizen of the United States, residing at Middletown, in the county of Butler and State of Ohio, have invented certain new and useful Improvements in Grain-Bins, of which the following is a specification, reference being had therein to the accompanying drawing.

This invention relates to metallic grain bins and similar structures requiring interior ventilation.

The object of the invention is to provide a structure of this kind with ventilating openings which will permit of a relatively large circulation of air without permitting the escape of the grain or other contents of the structure.

It is also an object of the invention to so form the openings in the wall of the structure as to avoid weakening the same; and further to provide in conjunction with the openings means to reinforce the walls of the structure.

And a further object of the invention is to provide a structure of this kind which can be produced at low cost.

In the accompanying drawings Figure 1 is a side elevation of a grain bin embodying my invention; Fig. 2 is a perspective view of a portion of the wall of such a structure; Fig. 3 is a section taken horizontally through a portion of the wall; and Fig. 4 is a perspective view of a portion of the wall of such a structure showing a slightly modified arrangement of the openings.

In these drawings I have illustrated one embodiment of the invention and have shown the same as applied to a grain bin which is substantially cylindrical in shape, and is made up of a series of courses each of which comprises a plurality of curved plates, the plates being flanged at their edges to permit them to be rigidly connected one to the other. It is to be understood however that this particular structure is chosen for the purpose of illustration only and that the invention is applicable to structures of various kinds, and to structures designed for various purposes.

In that form of the invention here shown each plate of the structure, which is here indicated by the reference numeral 1, is provided with a plurality of openings 2 which are arranged in rows extending circumferentially of the structure. This particular arrangement however is not an essential part of the invention and the openings may be placed as desired. Each opening 2 is of a relatively large size so as to permit of a free circulation of the air through the same. To prevent the escape of the grain, or other contents of the structure, through these large openings I have provided each opening with a guard strip 3, which extends across the opening and which is secured at its ends to the wall of the structure adjacent to the respective edges of the openings. The lateral edges of this guard strip are spaced away from the adjacent edges of the opening to form apertures 4 which serve to connect the openings 2 with the atmosphere on the other side of the structure. The size of these apertures may be varied according to the purpose for which the structure is being used. In a grain bin, such as that here shown, the apertures will be as large as they can be made without permitting the passage of a grain of wheat, or other small cereal. The guard strips are preferably curved at their ends, which gives them a truss-like shape, and inasmuch as the ends of these strips are rigidly secured to the wall of the structure the truss-like strips tend to reinforce the walls and prevent their bending or buckling. Thus not only does the application of the invention to the wall of a structure fail to weaken that structure, but, on the contrary, it actually strengthens the same. The shape of the openings, and consequently of the guard strips, may be of any suitable character, but preferably the guard strips are arranged substantially vertically of the structure as this arrangement serves better to render the structure weatherproof. The entrance of water or moisture from the sides of the structure may be further prevented by providing the wall along the lateral edges of each opening with narrow flanges 5 which will deflect rain or water that might otherwise enter the structure through the openings.

Preferably the openings are formed by punching, and the guard strips comprise those portions of the wall which are pressed out of the same in forming the openings, and are therefore integral with the wall itself. The strips, or indented portions, of the wall are pressed inward a distance sufficient to carry the outer surfaces thereof beyond the inner surface of the wall. The punch and die used for forming the openings are so shaped that the indented portions or strips will be severed from the body of the wall along their lateral edges but will not be severed or broken at their ends, thus providing the apertures, which are here shown in the form of elongated slots, on the opposite sides of the guard strips and giving the strip its truss-like shape. The flanges at the lateral edges of the opening are, in the present instance, in the nature of fins formed by the punch and die when the strip is pressed inward.

As shown in Figs. 1 to 3 the openings and their guard strips are elongated vertically of the structure and the openings of the several rows of openings do not overlap, but where additional strength is required the several openings may be so arranged that their adjacent ends will overlap, after the manner shown in Fig. 4, thus causing the ends of the truss-like strips to overlap and provide greater strength for the sheets from which the wall is formed. While ordinarily the guard-strips will be arranged on the inner sides of the openings, as herein shown, it will be obvious that the arrangement can be reversed if desirable under any conditions of use.

It will be apparent from the foregoing description that I have provided a structure with large ventilating openings, and by connecting these openings with the interior of the structure through the relatively narrow slots at the edges of the guard strips I am enabled to utilize the substantially full area of the openings without permitting the escape of the contents of the structure, and further, by providing the guard strips in the manner described, I have materially reinforced the walls of the structure.

While I have shown and described one embodiment of the invention I wish it to be understood that I do not desire to be limited to the details thereof, except as limited by the appended claims, as various modifications will occur to a person skilled in the art.

Having now fully described my invention, what I claim as new and desire to secure by Letters Patent is:

1. A grain bin or the like having elongated portions of its wall pressed inwardly to form openings therein and severed therefrom along their lateral edges only to form truss-like guard strips, each guard strip having its outer surface pressed inward beyond the inner surface of the body of said wall to form slots along the edges thereof to connect the adjacent opening with the interior of the bin, each slot being of a width less than the width of said opening.

2. A grain bin comprising a plurality of sheet metal sections flanged at their edges to afford means for connecting them one to the other, and each having a plurality of elongated openings, guard strips extending lengthwise of the respective openings, connected therewith at the ends thereof and bent inwardly a distance sufficient to form slots along both edges of each guard strip to connect the openings with the interior of the bin, said slots being of a width less than the width of said openings.

3. A grain bin or the like having an opening in the wall thereof, and a truss-like strip having its ends rigidly connected with said wall at opposite edges of said opening, and having its lateral edges spaced away from the adjacent edges of said opening to form slots of a width less than the width of said opening.

In testimony whereof, I affix my signature hereto.

CALVIN C. FOUTS.

Copies of this patent may be obtained for five cents each, by addressing the "Commissioner of Patents, Washington, D. C."